United States Patent [19]
Stephenson et al.

[11] Patent Number: 5,129,424
[45] Date of Patent: Jul. 14, 1992

[54] FLUID CONTROLLER WITH INTEGRAL AUXILIARY VALVING

[75] Inventors: Dwight B. Stephenson, Savage; Kenneth G. Rasmussen, New Hope; H. P. Schutten, Eden Prairie, all of Minn.

[73] Assignee: Eaton Corporation, Cleveland, Ohio

[21] Appl. No.: 792,514

[22] Filed: Nov. 13, 1991

Related U.S. Application Data

[63] Continuation-in-part of Ser. No. 666,168, Mar. 7, 1991, Pat. No. 5,065,793, which is a continuation-in-part of Ser. No. 513,366, Apr. 23, 1990, Pat. No. 5,016,672.

[51] Int. Cl.$^5$ ............................................. F15B 13/06
[52] U.S. Cl. .................... 137/625.24; 60/384; 60/422; 91/467; 91/516
[58] Field of Search .................... 60/384, 422; 91/467, 91/516; 137/625.24

[56] References Cited

U.S. PATENT DOCUMENTS 3,455,210  7/1969  Allen .
3,481,147 12/1969  Goff .
3,996,742 12/1976  Goff .
3,996,838 12/1976  Goff .
4,043,419  8/1977  Larson et al. .
5,016,672  5/1991  Stephenson ...................... 60/384 X
5,065,793 11/1991  Stephenson et al. ............. 60/384 X Primary Examiner—Gerald A. Michalsky
Attorney, Agent, or Firm—L. J. Kasper

[57] ABSTRACT

A fluid controller (15) is provided of the type having a primary valve member (53) and a follow-up valve member (55). The controller includes a housing (41) defining main fluid ports (27,29) connected to a steering cylinder (19), and also defines auxiliary fluid ports (31,33), connected to an auxiliary fluid motor (21). The spool and sleeve cooperate with the housing to provide main control valving (35) controlling the flow of fluid to the steering cylinder in response to relative rotation of the spool and sleeve, and auxiliary control valving (35), controlling the flow to the auxiliary motor in response to axial motion of the sleeve, relative to the spool and housing. By performing both the main and auxiliary valving in the spool and sleeve, the main valving (35) is automatically given priority over the auxiliary valving (37), without the need for any expensive, complicated controls or interface between the two types of valving.

14 Claims, 6 Drawing Sheets

5,129,424

FLUID CONTROLLER WITH INTEGRAL AUXILIARY VALVING

CROSS-REFERENCE TO RELATED APPLICATION

This application is a continuation-in-part (CIP) of co-pending U.S. application Ser. No. 666,168, filed March 7, 1991 in the name of Dwight B. Stephenson and Dennis R. Marks for a "FLUID CONTROLLER WITH LOAD SENSING PRIORITY FLOW CONTROL CAPABILITY",now U.S. Pat. No. 5,065,793 which is a continuation-in-part of co-pending U.S. application Ser. No. 513,366, filed April 23, 1990, in the Name of Dwight B. Stephenson, for a "STEERING VALVE WITH INTEGRAL PARALLEL CONTROL", now U.S. Pat. No. 5,016,672.

BACKGROUND OF THE DISCLOSURE

The present invention relates to an open-center system for providing pressurized fluid to at least a main load circuit (fluid pressure operated device) and more particularly, to such a system including a fluid controller which defines a main fluid path and an auxiliary fluid path.

In many vehicle hydraulic systems, there are two primary load circuits, or fluid pressure operated devices. One is the hydraulic steering cylinder, and the other is some sort of auxiliary device, such as a lift cylinder or winch motor, etc.

In such systems, it is conventional to have a single pump for both load circuits to minimize the expense of the hydraulic system. In addition, the system would include a main steering control unit, to control the flow to the steering cylinder, and an auxiliary valve to control the flow to the auxiliary device. In addition to the cost of two separate valves, such a system would require some sort of control or interface between the valves because, typically, the steering circuit must be given priority over the auxiliary circuit, for safety purposes. Therefore, if the auxiliary device is being operated, and the vehicle operator initiates steering, flow to the auxiliary circuit must be interrupted, so that there is sufficient pressurized fluid available to the steering circuit. The need for such interface controls would make a system of the type described quite expensive and complicated.

SUMMARY OF THE INVENTION

Accordingly, it is an object of the present invention to provide an open-center system for controlling flow of pressurized fluid to both a main device and an auxiliary device, wherein only a single valve assembly is required to perform both valving actions.

It is a more specific aspect of the present invention to provide such a system in which the valving to the main device is automatically and mechanically given priority over the valving which controls flow to the auxiliary device.

The above and other objects of the present invention are accomplished by the provision of an improved controller operable to control the flow of fluid from a source of pressurized fluid to a main fluid pressure operated device, and to an auxiliary fluid pressure device. The controller is of the type including housing means defining a fluid inlet port for connection to the source of pressurized fluid, a return port for connection to the system reservoir, and first and second main fluid ports for connection to the main fluid pressure operated device. Valve means is disposed in the housing means and composes a primary, rotatable valve member and a cooperating, relatively rotatable follow-up valve member, the primary and follow-up valve members defining a neutral rotary position and a rotary operating position in which the primary valve member is rotatably displaced from the neutral rotary position, relative to the follow-up valve member. The follow-up valve member defines a neutral axial position. The primary valve member defines first and second fluid passages and the follow-up valve member defines a first fluid port in continuous fluid communication with the inlet port, and a second fluid port in continuous communication with the first main fluid port, the first and second fluid ports being blocked from fluid communication with the first and second fluid passages, respectively, when the valve members are in the neutral rotary position. The first fluid port is in fluid communication with the first fluid passage, to define a first variable flow control orifice, and the second fluid port is in fluid communication with the second fluid passage, to define a second variable flow control orifice, when the valve members are in the rotary operating position. The housing means and the valve means cooperate to define a main fluid path providing fluid communication between the first and second variable flow control orifices when the valve members are in the rotary operating position.

The improved controller is characterized by the housing means defining first and second auxiliary fluid ports for connection to the auxiliary fluid pressure operated device. The follow-up valve member defines a first axial position, and the controller includes means operable to bias the follow-up valve member toward the neutralaxial position, and means operable to displace the follow-up valve member toward the first axial position. The housing means and the valve means cooperate to define a first auxiliary fluid path providing fluid communication from the inlet port to the first auxiliary fluid port, and from the second auxiliary fluid port to the return port, when the valve members are in the first axial position.

DESCRIPTION OF THE PREFERRED EMBODIMENT

Figure 1:
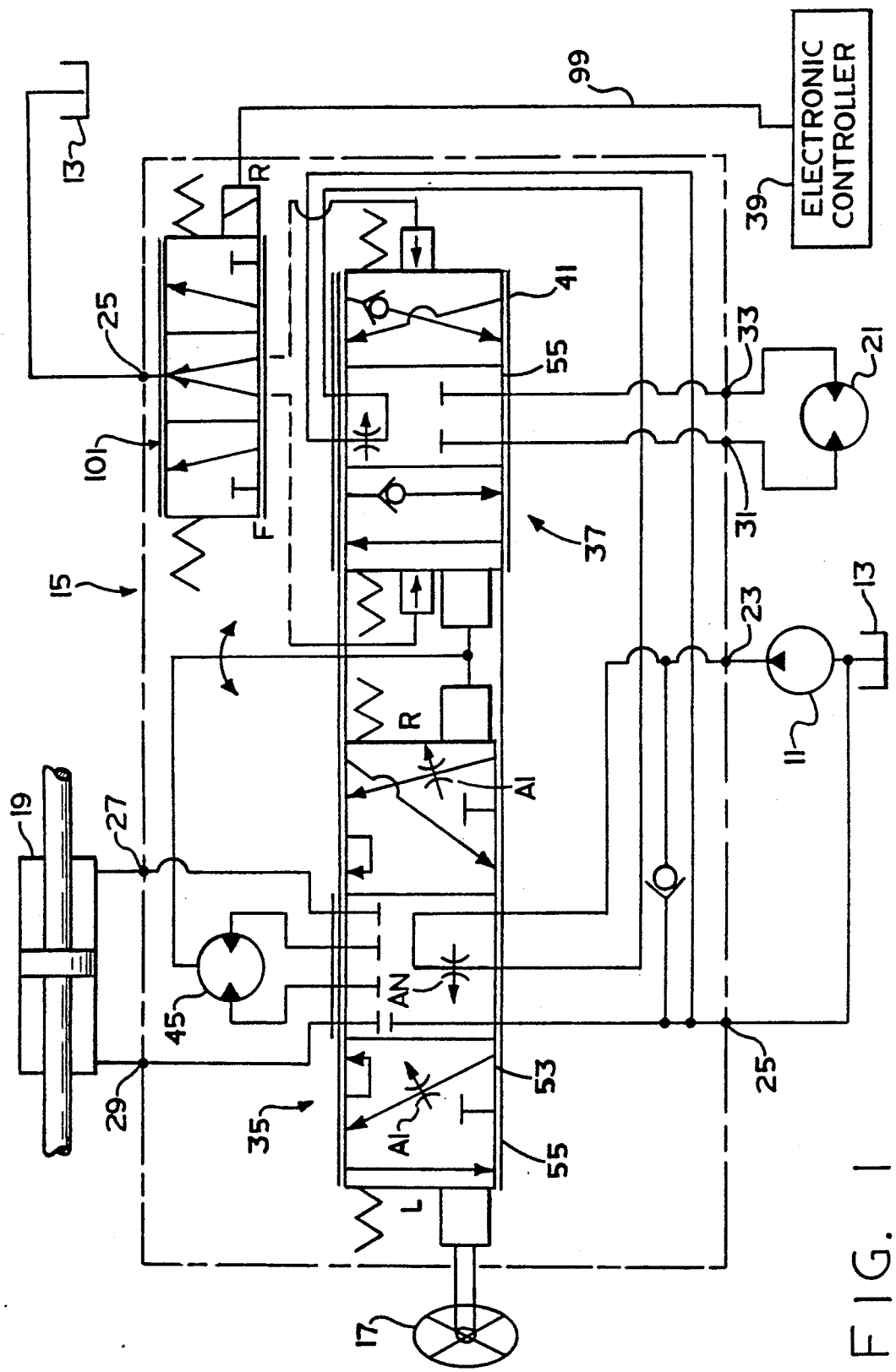
FIG. 1 is a hydraulic schematic of an open-center flow control system, made in accordance with the present invention.

Referring now to the drawings, which are not intended to limit the invention, FIG. 1 is a hydraulic schematic of an open-center flow control system made in accordance with the invention. It should be understood, however, that the present invention is not limited to open-center applications, but could also be used in connection with both closed-center and load sensing applications.

More specifically, the schematic of FIG. 1 illustrates a vehicle hydrostatic power steering system, including a fluid controller made in accordance with the present invention. The system includes a fluid pump 11, shown herein as a fixed-displacement pump, having its inlet connected to a system reservoir 13. The system includes a fluid controller, generally designated 15, which receives rotary input by means of a steering wheel 17, and apportions the flow of fluid from the pump 11 between (1) a main load circuit including a fluid pressure operated vehicle steering cylinder 19; and (2) an auxiliary load circuit, represented schematically as a rotary fluid motor 21.

Referring still to FIG. 1, the fluid controller 15 includes an inlet port 23, a return port 25 (shown at two locations on the schematic of FIG. 1), and a pair of main (cylinder) fluid ports 27 and 29, which are connected to opposite ends of the steering cylinder 19. The fluid controller further includes a pair of auxiliary fluid ports 31 and 33, which are connected to opposite sides of the auxiliary fluid motor 21.

In accordance with a primary feature of the present invention, the fluid controller 15 includes valving, which performs two distinct functions: (1) main (steering) control valving, generally designated 35; and (2) auxiliary control valving, generally designated 37. The function of the steering control valving 35, as is well known in the art, is to control the flow of fluid from the inlet port 23 to the steering cylinder 19, in response to rotation of the steering wheel 17. The function of the auxiliary control valving 37 is to control the flow of fluid from the inlet port 23 to the auxiliary fluid motor 21, in response to a command signal from an electronic controller 39, and in the absence of operation of the steering control valving.

It should be noted in viewing the schematic of FIG. 1 that some license has been taken therein in showing the controller 15, because the steering control valving 35 and the auxiliary control valving 37 are shown as schematically separate. However, in accordance with one aspect of the present invention, both the steering valving 35 and the auxiliary valving 37 are accomplished by the same valving elements as will be described in greater detail subsequently.

Figure 2:
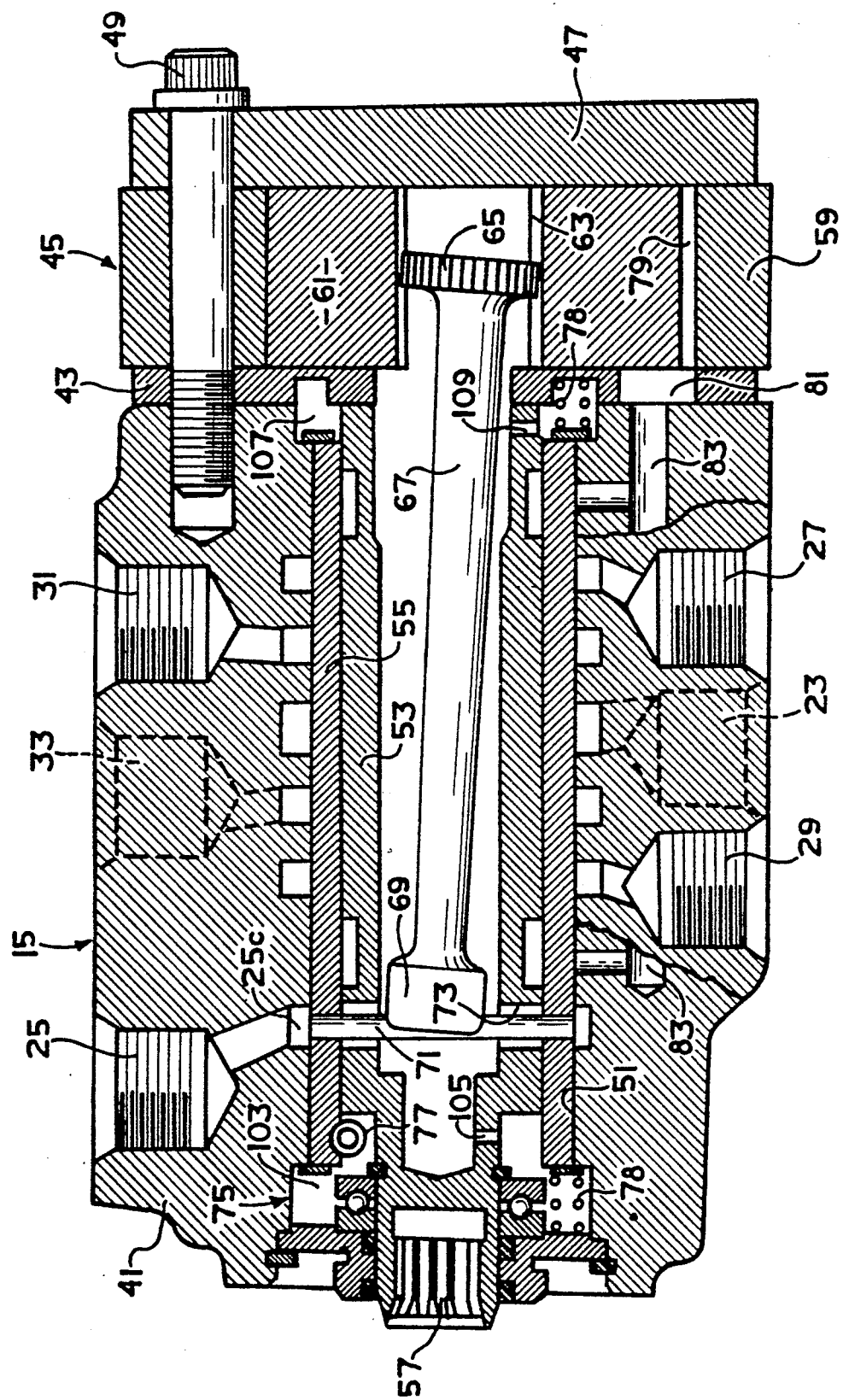
FIG. 2 is an axial cross-section of a fluid controller, made in accordance with the present invention, and in accordance with the schematic of FIG. 1.

Referring now to FIG. 2, and in conjunction with FIG. 1, the fluid controller 15 will be described in greater detail, structurally, but with reference to the schematic of FIG. 1, where appropriate. The fluid controller 15 may be of the general type illustrated and described in U.S. Pat. No. Re. 25,126, assigned to the assignee of the present invention, and incorporated herein by reference. The subject embodiment is more specifically of the type illustrated and described in U.S. Pat. No. 5,016,672, also assigned to the assignee of the present invention and incorporated herein by reference.

The fluid controller 15 comprises several sections, including a valve housing section 41, a wear plate 43, a section comprising a fluid meter 45 (also shown schematically in FIG. 1), and an end cap 47. These sections are held together in tight sealing engagement by means of a plurality of bolts 49, which are in threaded engagement with the valve housing section 41. The valve housing section 41 defines the fluid inlet port 23, the return port 25, the main fluid ports 27 and 29, and the auxiliary fluid ports 31 and 33.

The valve housing section 41 also defines a valve bore 51, and rotatably disposed therein is the valving arrangement shown schematically in FIG. 1 which, in the subject embodiment, comprises a primary, rotatably valve member 53 (also referred to hereinafter as the "spool") and a cooperating, relatively rotatable follow-up valve member 55 (also referred to hereinafter as the "sleeve"). At the forward end of the spool 53 is a portion having a reduced diameter and defining a set of internal splines 57 which provide for direct mechanical connection between the spool 53 and the steering wheel 17. The spool 53 and sleeve 55 will be described in greater detail subsequently.

The fluid meter 45 may be of the type well known in the art, and in the subject embodiment, includes an internally toothed ring member 59, and an externally-toothed star member 61. The star member 61 is eccentrically disposed within the ring member 59, for orbital and rotational movement relative thereto. The star member 61 defines a set of internal splines 63, and in splined engagement therewith is a set of external splines 65 formed at the rearward end of a main drive shaft 67, which has a bifurcated forward end 69 permitting driving connection between the shafts 67 and the sleeve 55, by means of a drive pin 71. The ends of the pin 71 pass through a pair of oversized pin openings 73 defined by the spool 53, and are received in relatively close fit openings in the sleeve 55. As is well known to those skilled in the art, pressurized fluid flows through the various passages and ports defined by the spool 53 and sleeve 55, then flows through the fluid meter 45, causing orbital and rotational movement of the star 61 within the ring 59. Such movement of the star 61 causes rotational follow-up movement of the sleeve 55 by means of the drive shaft 67 and pin 71, to maintain a particular relative displacement (referred to hereinafter as a "rotary operating position") between the spool 53 and the sleeve 55. The particular rotary operating position, i.e., the amount of rotational displacement between the spool and sleeve, is generally proportional to the rate of rotation of the steering wheel 17.

Referring still to FIG. 2, disposed adjacent the forward end (left end in FIG. 2) of the spool 53 and sleeve 55 is a neutral centering spring arrangement, generally designated 75, of the type which is illustrated and described in greater detail in co-pending application U.S. Ser. No. 703,318, filed May 20, 1991, in the name of Dwight B. Stephenson and James J. Hastreiter for a "IMPROVED FLUID CONTROLLER AND LOGIC CONTROL SYSTEM FOR USE THEREWITH", assigned to the assignee of the present invention and incorporated herein by reference. Typically, the arrangement 75 would include at least one helical, coiled compression spring 77 biasing the sleeve 55 toward a "rotary neutral" position, as that term will be defined in connection with FIG. 3, relative to the spool 53. In addition, at the forward end (left end in FIG. 2) of the sleeve 55, there is a plurality of relatively short, coiled compression springs 78, operable to bias the sleeve 55 toward a "neutral axial position", as that term will be defined in connection with FIG. 5 relative to the housing 41 and the spool 53. Similarly, at the rearward end of the sleeve 55 there is a plurality of the springs 78 operable to bias the sleeve 55 toward the neutral axial position.

Figure 3:
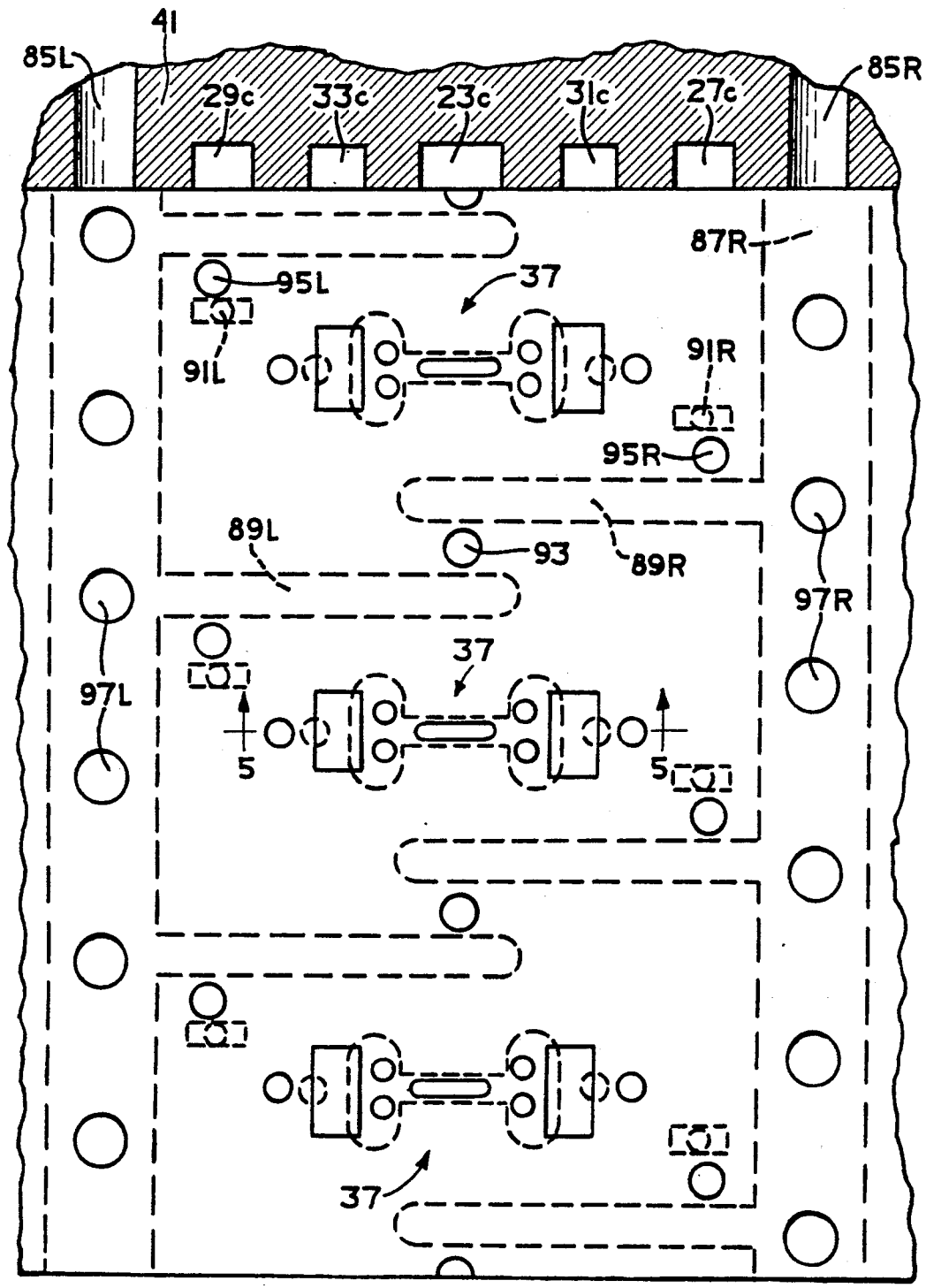
FIG. 3 is an overlay view of the valving used in the fluid controller shown in FIGS. 1 and 2, but on a larger scale than in FIG. 2, and including a fragmentary, axial cross-section of the housing, with the valving being illustrated in the rotary neutral position.

Referring now to FIG. 2, in conjunction with FIG. 3, the valve bore 51 of the valve housing section 41 defines a plurality of annular fluid chambers surrounding the sleeve 55, to provide fluid communication between the various ports (23 through 33) and the outer surface of the sleeve 55. An annular chamber 23c receives pressurized fluid from the inlet port 23, while an annular chamber 25c (shown only in FIG. 2) communicates return fluid to the return port 25. An annular chamber 27c provides communication to or from the control port 27, while an annular chamber 29c provides communication to or from the control port 29. Finally, an annular chamber 31c provides communication to or from the auxiliary port 31, while an annular chamber 33c provides communication to or from the auxiliary port 33.

The toothed interaction of the star 61, orbiting and rotating within the ring 59, defines a plurality of expanding and contracting fluid volume chambers 79, and adjacent each such chamber 79, the wear plat 43 defines a fluid port 81. The valve housing section 41 defines a plurality of axial bores 83 (only one of which is shown in FIG. 2, but shown broken into two portions), each of which is in open communication with one of the fluid ports 81. The valve housing 41 further defines a pair of radial bores 85L and 85R (see FIG. 3) providing communication between each of the axial bores 83 and the valve bore 51, for purposes which will be described in greater detail subsequently.

It is believed that the normal rotary actuation of the main control valving 35 is well known to those skilled in the art, and the operation of such valving will be described only briefly herein, but somewhat further in connection with FIG. 4. As the steering wheel 17 is rotated, for example, in the clockwise direction, to achieve a right turn of the vehicle, the spool 53 is also rotated clockwise, as viewed by the vehicle operator, opening up a series of variable flow control orifices between the spool 53 and the sleeve 55. These orifices permit fluid communication from the annular chamber 23c through the valving 35, then through the radial bores 85R and the axial bore 83 to the expanding volume chamber 79 of the fluid meter 45. Fluid flowing from the contracting volume chambers of the meter 45 flow through other of the axial bores 83, then through the radial bores 85L, and through the valving 35, then out to the cylinder port 27. Fluid returning from the steering cylinder 19 enters the cylinder port 29, then flows through the valving 35, and then out to the return port 25. The above-described fluid path, or some portion thereof, is typically referred to as the "main fluid path", and the use of that term hereinafter, and in the appended claims, will be understood to mean the above-described fluid path, or a portion thereof, when the spool 53 and sleeve 55 are in a rotary operating position.

It is one important aspect of the present invention to be able to define variable flow control orifices in the controller valving, in response to both relative rotary motion of the spool 53 and sleeve 55, and axial motion of the sleeve 55 relative to the valve housing 41 and the spool 53. In the subject embodiment, by way of example and not limitation, such relative axial motion is accomplished by making the sleeve 55 axially shorter than the adjacent portion of the spool 53, and by providing means for axially displacing the sleeve 55 relative to the valve housing 41 (and relative to the spool 53). Furthermore, in the subject embodiment, and again by way of example and not limitation, the interface between the spool 53 and the sleeve 55 defines, in response to relative rotation therebetween, the variable flow control orifices which comprise the main control valving 35, while the interface between the sleeve 55 and the housing 41 defines, in response to axial motion therebetween, the variable flow control orifices which comprise the auxiliary control valving 37.

Rotary Valving Arrangement

In connection with the subsequent description of the valving arrangement, and in the appended claims, various elements are referred to by the term "axial". It will be understood by those skilled in the art that such use of the term "axial" is not necessarily intended to define a structural feature of the particular element, or a particular orientation, but instead is intended to indicate that that particular element is related to the axial actuation of the sleeve 55, or is involved in defining the orifices of the auxiliary control valving 37.

Referring now primarily to FIG. 3, the spool 53 and sleeve 55 will be described in greater detail, with regard to the various ports and passages defined thereby. In connection with the subsequent description, it should be noted that many of the ports and passages are arranged symmetrically, or generally symmetrically, with respect to the annular chamber 23c, and such elements will be described by a reference numeral followed by either an L or an R to indicated that the element is located on either the left side or the right side, respectively, of the chamber 23c. On the other hand, certain of the other elements are axially centered relative to the chamber 23c, and will be referred to by use of a reference numeral alone.

Figure 4:
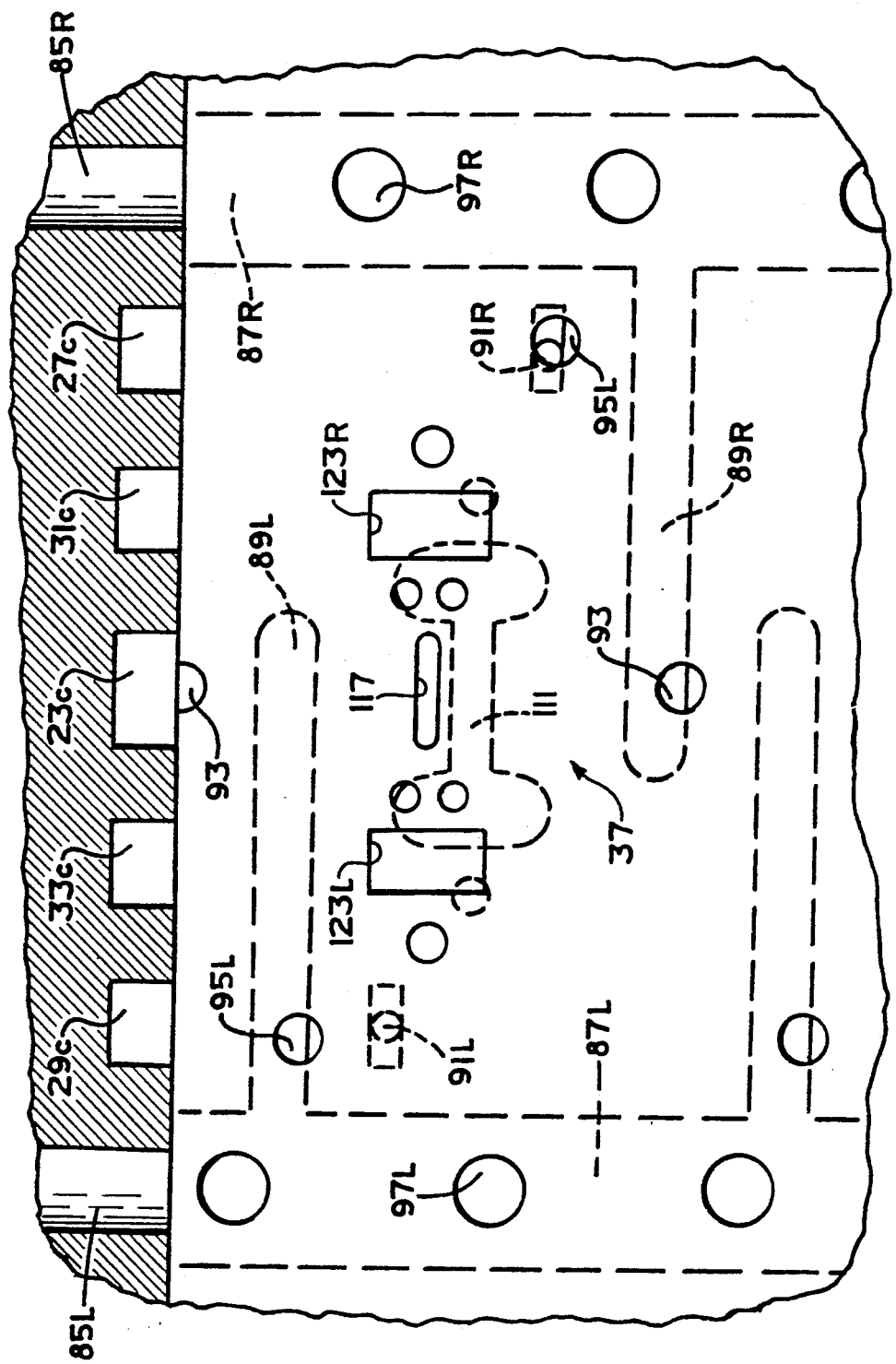
FIG. 4 is an enlarged, fragmentary overlay view, similar to FIG. 3, but with the valving displaced to a rotary operating position (a right turn).

It should be understood that the various overlay views, such as FIGS. 3 and 4 are intended to illustrate primarily the interface between the spool 53 (dashed lines) and the sleeve 55 (solid lines). The spool 53 defines a pair of generally annular meter grooves 87L and 87R, which are axially aligned with the radial bores 85L and 85R, respectively. In communication with the meter groove 87L is a plurality of pressure passages 89L, and in communication with the meter groove 87R is a plurality of pressure passages 89R. Adjacent each pressure passage 89L is a tank port 91L, and adjacent each pressure passage 89R is a tank port 91R. As may be seen by comparing FIG. 3 with FIG. 2, the pin openings 73 (not shown in FIG. 3) would be disposed somewhat to the left of the meter groove 87L. The remaining structural features of the spool 53 will be described subsequently in connection with FIGS. 4 through 7.

The sleeve 55 defines three pressure ports 93, disposed to be in continuous fluid communication with the annular chamber 23c. It should be noted in FIG. 3, which illustrates the entire circumference of the spool and sleeve, that there are three each of a number of elements such as the pressure ports 93, which are therefore disposed 120° apart. The sleeve 55 defines an operating port 95L, disposed to be in continuous fluid communication with the annular chamber 29c, each of the operating ports 95L being disposed circumferentially adjacent a pressure passage 89L. Similarly, the sleeve 55 defines a plurality of operating ports 95R, disposed to be in continuous fluid communication with the annular chamber 27c, with each of the operating ports 95R being disposed circumferentially adjacent a pressure passage 89R. Finally, the sleeve 55 defines a plurality of meter ports 97L, each of which is in continuous communication with the meter groove 87L, and in commutating fluid communication with the radial bores 85L. Similarly, the sleeve 55 defines a plurality of meter ports 97R, each of which is in continuous communication with the meter groove 87R, and in commutating fluid communication with the radial bores 85R.

Rotary Operating Position

Referring now primarily to FIG. 4, when the steering wheel 17 and the spool 53 are rotated clockwise (i.e., the spool 53 moves "down" in FIG. 4), pressurized fluid flows from the annular chamber 23c through the pressure ports 93, and into the pressure passages 89R, the overlap therebetween cumulatively defining a main variable flow control orifice Al (see also FIG. 1). This "unmetered" fluid flows from the pressure passages 89R into the meter groove 87R, then through the meter ports 97R to the expanding volume chambers 79 of the fluid meter 45, in the manner described previously. "Metered" fluid flows from the contracting volume chambers 79, in the manner described previously, into the meter ports 97L, then through the meter groove 87L into the pressure passages 89L. The pressure passages 89L are now in communication with the operating ports 95L, the cumulative overlap therebetween defining a variable flow control orifice A4 (which is well known to those skilled in the art, and not illustrated elsewhere herein). Metered fluid flows from the A4 orifice into the annular chamber 29c, then to the main fluid port 29, and then to the steering cylinder 19. Fluid returning from the exhaust side of the steering cylinder flows to the main fluid port 27, then into the annular chamber 27c, then through a variable flow control orifice A5, defined by the cumulative overlap of the operating ports 95R and the tank ports 91R, the A5 orifice being well known to those skilled in the art and not illustrated elsewhere herein. The low pressure exhaust fluid flows from the A5 orifice to the interior of the spool 53, then radially outward through the pin openings 73 into the annular chamber 25c, and from there to the return port 25, in the manner well known in the art.

The above-described flow path comprises part of the main fluid path referred to previously, and defined by the main control valving 35 when the spool 53 and sleeve 55 are relatively displaced from the neutral rotary position of FIG. 3 to the rotary operating position of FIG. 4. It should be noted that the main control valving 35 has been described as being at the interface of the spool 53 and sleeve 55, because that is where the Al, A4, and A5 variable flow control orifices are defined. However, as is conventional, and well known in the art, the commutating communication to and from the fluid meter 45 (which comprises part of the main control valving 35) occurs at the interface of the sleeve 55 and housing 41, i.e., between the meter ports 97L and 97R, and the radial bores 85L and 85R, respectively, in response to rotation of the sleeve 55.

Axial Valving Arrangement

It should be noted that in both FIGS. 3 and 4, the sleeve 55 is in what might be considered its "neutral axial position", the position to which the sleeve is biased by the compression springs 78. When the vehicle operator wishes to operate the auxiliary fluid motor 21, all that is required is to actuate the electronic controller 39, which communicates an electrical signal 99 to a pilot control valve 101, shown only schematically herein, but illustrated and described in greater detail in above-incorporated U.S. Pat. No. 5,016,672.

For simplicity, and by way of example only, the pilot control valve 101 is illustrated herein as operating on "regulated" tank pressure, i.e., a pressure at the return port which is maintained at a predetermined pressure level, such as 100 psi, such as by means of a downstream restriction between the return port 25 and the system reservoir. The creation and use of a regulated tank pressure is well known to those skilled in the art, and will not be described further herein. Referring again to FIG. 2, at the forward end (left end in FIG. 2) of the sleeve 55 is a pressure chamber 103 which is in communication with the regulated tank pressure within the interior of the spool 53 by means of a passage 105. Similarly, at the rearward end of the sleeve 55 is a pressure chamber 107, in communication with the regulated tank pressure in the interior of the spool 53 by means of a passage 109. When the pilot control valve 101 is in the centered (neutral) position shown in FIG. 1, both of the pressure chambers 103 and 107 are communicated to the system reservoir 13. However, upon actuation by means of the electrical signal 99 to a position "F" corresponding to forward operation of the auxiliary motor 21, the pressure chamber 107 is still communicated to the reservoir, but communication from the pressure chamber 103 to the reservoir is now blocked, and pilot pressure builds within the chamber 103, biasing the sleeve to the right in FIG. 2.

Figure 5:
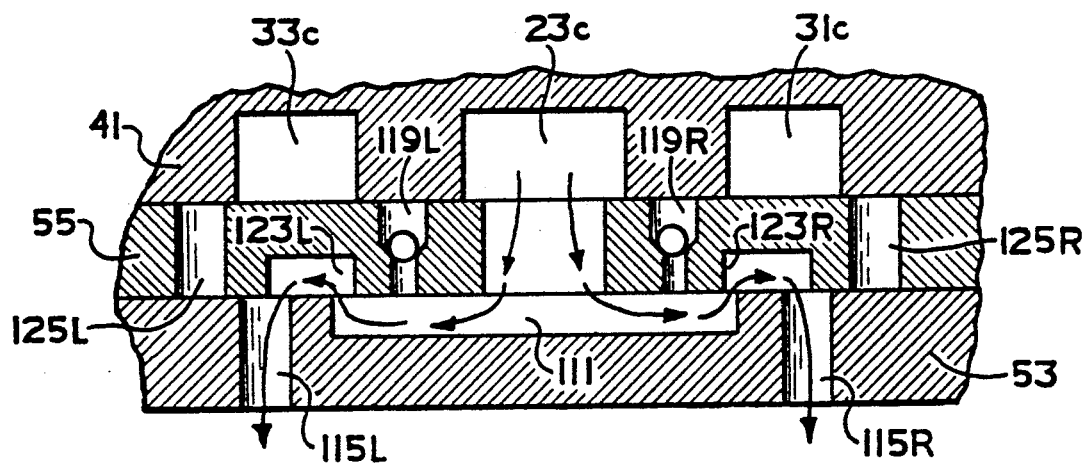
FIG. 5 is a fragmentary, axial cross-section taken on line 5—5 of FIG. 3, but on a larger scale.
Figure 6:
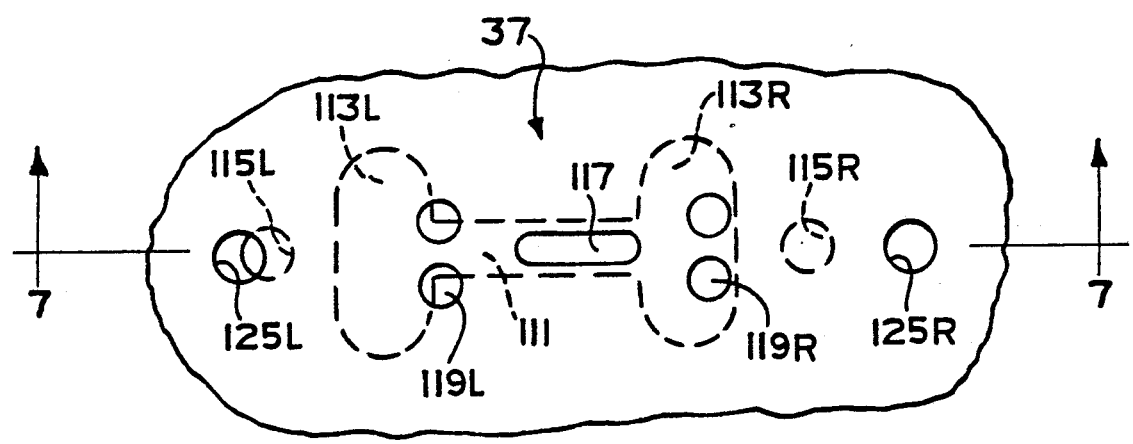
FIG. 6 is a fragmentary overlay view, similar to FIGS. 3 and 4, but on a larger scale, and with the valving displaced to an axial operating position.
Figure 7:
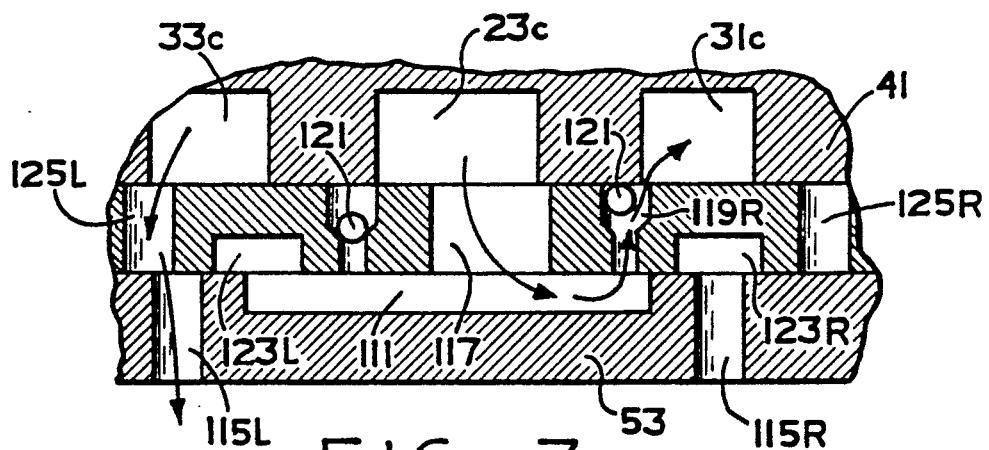
FIG. 7 is an axial cross-section, taken on line 7—7 of FIG. 6, and on the same scale as FIG. 6.

Referring again to FIG. 3, in which the spool and sleeve are in the rotary neutral and axial neutral position, the spool and sleeve define a generally symmetrical (i.e., relative to the annular chamber 23c) region of ports and passages which comprises, along with the annular chambers 31c and 33c, the auxiliary control valving 37. For consistency, as there are three rotary metering points about the circumference of the spool and sleeve, there are three identical regions of ports and passages which together comprise the auxiliary control valving 37. Referring now to FIGS. 5 through 7, the auxiliary control valving 37 will be described in some detail. The spool 53 defines a generally H-shaped recess 111 disposed on the outer surface of the spool. The recess 111 includes opposite, circumferentially-extending end portions 113L and 113R (see FIG. 6). Disposed adjacent the ends of the recess 111 are a pair of drain ports 15L and 115R, communicating with the interior of the spool 53.

The sleeve 55 defines an axially elongated pressure port 117 which is in continuous fluid communication with the inlet port 23 by means of the annular chamber 23c, regardless of the rotary or axial position of the sleeve 55. Disposed adjacent the left end of the port 117 is a pair of check passages 119L, and disposed adjacent the right end of the port 117 is a pair of check passages 119R. Disposed in each of the check passages is a check ball 121, the function of which will be described subsequently. Disposed to the left of the check passages 119L, the interior surface of the sleeve 55 defines an arcuate milled recess 123L. Similarly, disposed to the right of the check passages 119R, the interior of the sleeve defines an arcuate milled recess 123R. Finally, disposed further axially outward, the sleeve 55 defines drain ports 125L and 125R.

With the spool and sleeve in the neutral axial position shown in FIGS. 3 and 5, the pressure port 117 is in communication with the recess 111, and the end portions 113L and 113R of the recess 111 are in communication with the milled recesses 123L and 123R, respectively. In turn, the recesses 123L and 123R are open to the drain ports 115L and 115R, respectively, the cumulative overlap of the various recesses and ports just described comprising a variable neutral orifice AN (see FIG. 1). Therefore, in the neutral rotary, neutral axial position shown in FIGS. 3 and 5, pressurized fluid from the inlet port 23 flows to the interior of the spool 53 (see arrows in FIG. 5), thus making the controller 15 an open-center device.

Referring now to FIG. 4, when the spool and sleeve are displaced to the rotary operating position, the recess 111 is moved to a position out of fluid communication with the pressure port 117, thus interrupting the open-center path described previously, and permitting fluid flow through the main control valving 35 in the manner described previously in connection with FIG. 4.

Axial Operating Position

Referring now primarily to FIGS. 6 and 7, the axial operating position of the spool and sleeve will be described, i.e., the position which occurs when the electronic controller 39 is actuated, to operate the pilot control valve 101, in the manner described previously, to bias the spool 55 to the right in FIGS. 2, 6, and 7. As may be seen in FIG. 6, the axial operating position (to actuate the auxiliary control valving 37) can occur only when the spool and sleeve are in the rotary neutral position, i.e., the main control valving 35 has priority over the auxiliary valving 37. When the sleeve 55 is shifted to the right in FIGS. 6 and 7, pressurized fluid from the inlet port 23 flows through the annular chamber 23c, then through the pressure port 117 into the recess 111, in the manner described previously. However, with the sleeve shifted as shown, the check passages 119R are now in a position to communicate pressurized fluid from the end portion 113L of the recess 111 into the annular chamber 31c. From there, pressurized fluid is communicated to the auxiliary fluid port 31, driving the auxiliary motor 21 in a forward direction. Low pressure exhaust fluid from the motor 21 returns to the auxiliary fluid port 33, then into the annular chamber 33c, from where it flows through the drain port 125L defined by the sleeve, then through the drain port 115L defined by the spool, and eventually to the return port 25 in the manner described previously.

The check passages 119L and 119R are configured as shown herein, and include check balls 121 in order to provide a "load holding" capability. If the sleeve 55 remains in the position shown in FIGS. 6 and 7, and the auxiliary motor 21 is supporting a load, the result could be a reverse flow (i.e., a flow opposite the arrows shown in FIG. 7). However, the inclusion of the check balls 121 in the check passages 119R prevent any such reverse flow, and prevent any dropping of the load.

It should be apparent in viewing FIG. 7 that, if the operator wishes to reverse the direction of operation of the auxiliary motor 21, the electrical signal 99 is changed to position the pilot control valve 101 in a position ("R") corresponding to the reverse operation of the motor 21. The result is that the fluid pressure in the chamber 103 is drained, while pilot pressure builds in the pressure chamber 107, biasing the sleeve 55 to the left from the positions shown in FIGS. 2, 3, and 5. In the reverse position, pressurized fluid flows from the annular chamber 23c through the pressure port 117 into the recess 111, then through the end portion 113L of the recess 111, and through the check passages 119L to the annular chamber 33c. At the same time, low pressure exhaust fluid returns from the motor 21 to the port 31, flowing from the annular chamber 31c through the drain ports 125R and 115R to the interior of the spool, and then to the return port 125.

Alternative Embodiment

Figure 8:
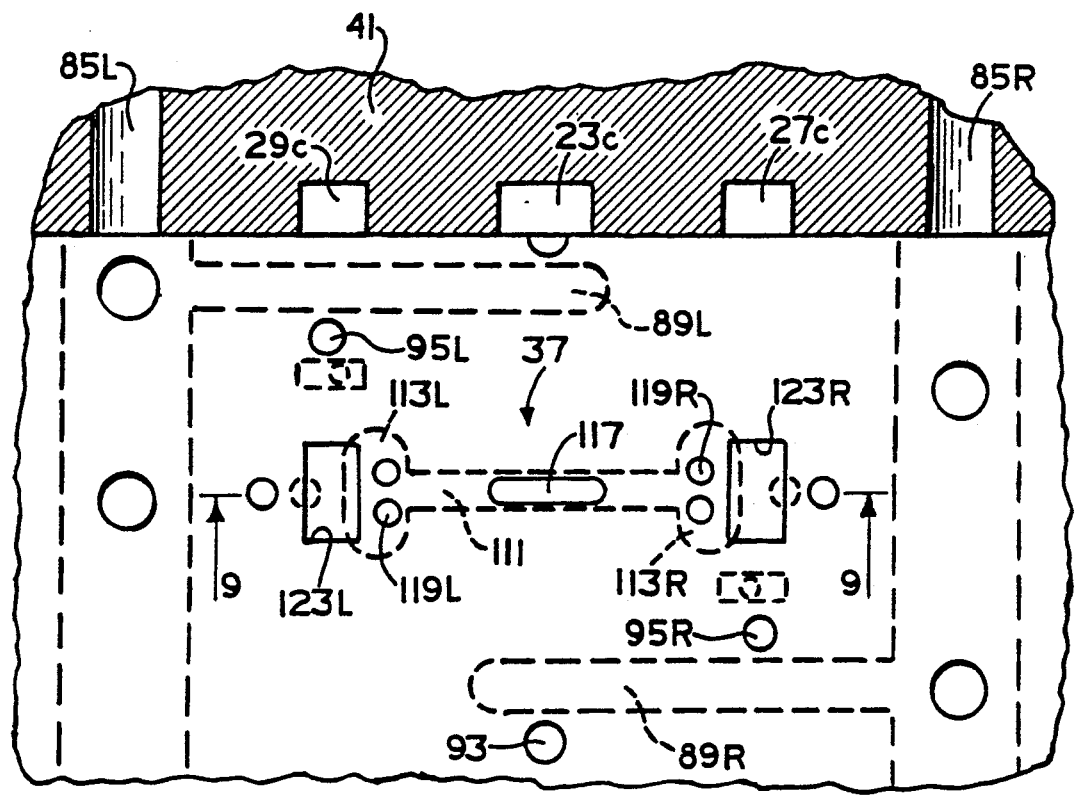
FIG. 8 is a fragmentary overlay view, similar to FIGS. 3 and 4, illustrating an alternative embodiment of the invention.
Figure 9:
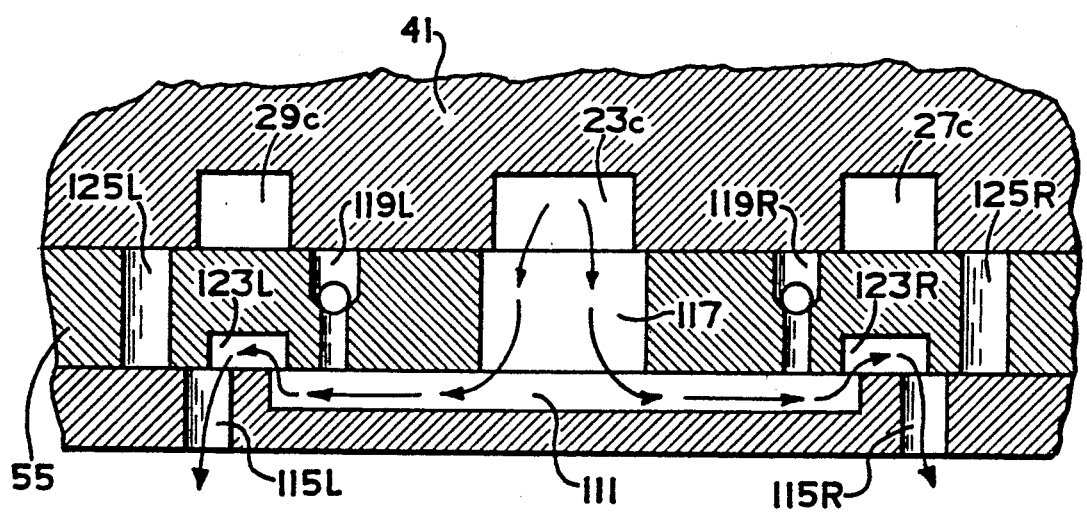
FIG. 9 is an axial cross-section, taken on line 9—9 of FIG. 8, but on a somewhat larger scale than FIG. 8.

Referring now primarily to FIGS. 8 and 9, an alternative embodiment of the invention will be described. For ease of explanation, elements which have substantially the same construction and function as in the embodiment of FIGS. 3 through 7 will bear the same reference numerals, and there are no added elements in the embodiment of FIGS. 8 and 9.

By comparing the axial cross-section of the housing in FIG. 8 to that shown in FIG. 3, it may be seen that the embodiment of FIGS. 8 and 9 does not include auxiliary fluid ports 31 and 33, and therefore, does not include annular chambers 31c and 33c.

The purpose of the alternative embodiment is to provide a controller in which both the main control valving 35 and the "auxiliary" control valving 37 provide flow to the steering cylinder 19, but wherein the controller is, overall, of an open-center configuration.

With the sleeve 55 in the neutral axial position as shown in FIGS. 8 and 9, and with the spool and sleeve in the neutral rotary position, flow from the inlet port 23 flows through the annular chamber 23c, then through the pressure port 117 into the recess 111. Pressurized fluid flows from the end portions 113L and 113R of the recess 111 through the milled recesses 123L and 123R, respectively, defined by the sleeve 55, then through the drain port 115L and 115R, respectively, as was described in connection with FIG. 5. Thus, the open-center function of the alternative embodiment is substantially the same as that of the prior embodiment, although it may be seen by comparing FIG. 8 to FIG. 3 that the recess 111 of the alternative embodiment is substantially elongated, axially, relative to that in the primary embodiment.

Another difference is that in the prior embodiment, the milled recesses 123L and 123R are axially aligned with the annular chambers 33c and 31c, respectively. In the alternative embodiment, the milled recesses 123L and 123R are axially aligned with the annular chambers 29c and 27c, respectively, for reasons which will become apparent subsequently.

Referring still to FIGS. 8 and 9, when the sleeve 55 of the alternative embodiment is displaced from the neutral axial position shown in FIGS. 8 and 9 to an axial operating position (i.e., the sleeve 55 is moved to the left from the position of FIGS. 8 and 9), the result will still be the definition of an "auxiliary" fluid path as in the previous embodiment, but the auxiliary fluid path will not be directed to an auxiliary fluid motor 21, but instead, will be directed to the steering cylinder 19 in the same general manner as in above-incorporated U.S. Pat. No. 5,016,672.

As the sleeve 55 moves to the left in FIGS. 8 and 9, pressurized fluid flows through the pressure port 117 into the recess 111, then into the end portion 113L, then radially outwardly through the check passages 119L and into the annular chamber 29c which, as explained previously, is in communication with the main fluid port 29, and connected to the steering cylinder 19.

Low pressure, exhaust fluid returning from the steering cylinder 19 enters the main fluid port 27, then flows through the annular chamber 27c, then through the drain port 125R in the sleeve 55, then the drain port 115R in the spool 53. From the drain port 115R, the exhaust fluid flows through the interior of the spool 53 and into the return port 25.

The invention has been described in great detail in the foregoing specification, and it is believed that various alterations and modifications of the invention will become apparent to those skilled in the art from a reading and understanding of the specification. It is intended that all such alterations and modifications are included in the invention, insofar as they come within the scope of the appended claims.

We claim:

1. A controller operable to control the flow of fluid from a source of pressurized fluid to a main fluid pressure operated device, and to an auxiliary fluid pressure operated device; said controller being of the type including housing means defining a fluid inlet port for connection to the source of pressurized fluid, a return port for connection to a system reservoir, and first and second main fluid ports for connection to the main fluid pressure operated device; valve means disposed in said housing means and comprising a primary, rotatable valve member and a cooperating, relatively rotatable follow-up valve member, said primary and follow-up valve members defining a neutral rotary position and a rotary operating position in which said primary valve member is rotatably displaced from said neutral rotary position, relative to said follow-up valve member, and said follow-up valve member defining a neutral axial position; said primary valve member defining first and second fluid passages, and said follow-up valve member defining a first fluid port in continuous fluid communication with said inlet port, and a second fluid port in continuous fluid communication with said first main fluid port, said first and second fluid ports being blocked from fluid communication with said first and second fluid passages, respectively, when said valve members are in said neutral rotary position; said first fluid port being in fluid communication with said first fluid passage, to define a first variable flow control orifice, and said second fluid port being in fluid communication with said second fluid passage, to define a second variable flow control orifice, when said valve members are in said rotary operating position; said housing means and said valve means cooperating to define a main fluid path providing fluid communication between said first and second variable flow control orifices when said valve members are in said rotary operating position, characterized by:
   (a) said housing means defining first and second auxiliary fluid ports for connection to the auxiliary fluid pressure operated device;
   (b) said follow-up valve member defining a first axial position;
   (c) said controller including means operable to bias said follow-up valve member toward said neutral axial position, and means operable to displace said follow-up valve member toward said first position;
   (d) said housing means and said valve means cooperating to define a first auxiliary fluid path providing fluid communication from said inlet port to said first auxiliary fluid port, and from said second auxiliary fluid port to said return port when said valve members are in said first axial position.

2. A controller as claimed in claim 1, characterized by fluid actuated means for imparting follow-up movement to said follow-up valve member proportional to the volume of fluid flow through said main fluid path when said valve members are in said rotary operating position.

3. A controller as claimed in claim 1, characterized by said primary and follow-up valve members cooperating with said housing means to define first and second axial chambers, said means to displace said follow-up valve member toward said first axial position comprising means operable to provide a pilot pressure in said first axial chamber.

4. A controller as claimed in claim 3, characterized by said follow-up valve member defining a second axial position, and said controller including means operable to displace said follow-up valve member toward said second axial position.

5. A controller as claimed in claim 4, characterized by said housing means and said valve means cooperating to define a second auxiliary fluid path providing fluid communication from said inlet port to said second auxiliary fluid port, and from said first auxiliary fluid port to said return port when said valve members are in said second axial position.

6. A controller as claimed in claim 5, characterized by said means to displace said follow-up valve member toward said second axial position comprising means operable to provide a pilot pressure in said second axial chamber.

7. A controller as claimed in claim 1, characterized by said housing means defining a valve bore in which is rotatably disposed said follow-up valve member, said valve bore defining an annular inlet groove in continuous fluid communication with said fluid inlet port, and further defining first and second annular auxiliary grooves in continuous fluid communication with said first and second auxiliary fluid ports, respectively, said first and second auxiliary grooves being oppositely disposed about said annular inlet groove.

8. A controller as claimed in claim 7, characterized by said follow-up valve member defining an axially-extending inlet port in continuous fluid communication with said annular inlet groove, and blocked from fluid communication with said first and second annular, auxiliary grooves, when said follow-up valve member is in said neutral axial position.

9. A controller as claimed in claim 8, characterized by said axially-extending inlet port being disposed to provide fluid communication from said inlet groove to said first auxiliary groove, when said follow-up valve member is in said first axial position.

10. An open-center controller operable to control the flow of fluid from a source of pressurized fluid to a fluid pressure operated device; said controller being of the type including housing means defining a fluid inlet port for connection to the source of pressurized fluid, a return port for connection to a system reservoir, and first and second control fluid ports for connection to the fluid pressure operated device; valve means disposed in said housing means and comprising a primary, rotatable valve member and a cooperating, relatively rotatable follow-up valve member, said primary and follow-up valve members defining a neutral rotary position and a rotary operating position in which said primary valve member is rotatably displaced from said neutral rotary position, relative to said follow-up valve member, and said follow-up valve member defining a neutral axial position; said primary valve member defining first and second fluid passages, and said follow-up valve member defining a first fluid port in continuous fluid communication with said inlet port, and a second fluid port in continuous fluid communication with said first control fluid port, said first and second ports being blocked from fluid communication with said first and second fluid passages, respectively, when said valve members are in said neutral rotary position; said first fluid port being in fluid communication with said first fluid passage, to define a first rotary variable flow control orifice, and said second fluid port being in fluid communication with said second fluid passage, to define a second rotary variable flow control orifice, when said valve members are in said rotary operating position; said housing means and said valve means cooperating to define a main fluid path providing fluid communication between said first and second rotary variable flow control orifices, characterized by:
  (a) said follow-up valve member defining a first axial operating position;
  (b) said controller including means operable to bias said follow-up valve member toward said neutral axial position, and means, operable to displace said follow-up valve member toward said first axial operating position;
  (c) said primary valve member defining an axial fluid passage and said follow-up valve member defining a first axial fluid port in continuous fluid communication with said inlet port, and a second axial fluid port in fluid communication with first control fluid port, when said follow-up valve member is in said first axial operating position, said first and second axial fluid ports being in fluid communication with said axial fluid passage when said follow-up valve member is in said axial operating position, and in said neutral rotary, position;
  (d) said primary and follow-up valve members cooperating to define neutral drain passage means providing fluid communication between said axial fluid passage and said return port when said follow-up valve member is in said neutral axial position, and said valve members are in said neutral rotary position.

11. An open-center controller as claimed in claim 10, characterized by fluid actuated means for imparting follow-up movement to said follow-up valve member proportional to the volume of fluid flow through said main fluid path when said valve members are in said rotary operating position.

12. An open-center controller as claimed in claim 10, characterized by said primary and follow-up valve members cooperating with said housing means to define first and second axial chambers, said means to displace said follow-up valve member toward said first axial operating position comprising means operable to provide a pilot pressure in said second axial chamber.

13. An open-center controller as claimed in claim 10, characterized by said housing means defining a valve bore in which is rotatably disposed said follow-up valve member, said valve bore defining an annular inlet groove in continuous fluid communication with said fluid inlet port, and further defining first and second annular grooves in continuous fluid communication with said first and second control fluid ports, respectively, said first and second annular grooves being oppositely disposed about said annular inlet groove.

14. An open-center controller as claimed in claim 13, characterized by said follow-up valve member defining an axially-extending inlet port in continuous fluid communication with said annular inlet groove, and blocked from fluid communication with said first and second annular grooves, when said follow-up valve member is in said neutral axial position.

* * * * *